(12) United States Patent
Ito et al.

(10) Patent No.: US 6,483,529 B1
(45) Date of Patent: Nov. 19, 2002

(54) MULTIBEAM SCANNER

(75) Inventors: Koji Ito, Gifu-ken (JP); Ryota Kato, Nagoya (JP); Yutaka Hattori, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/718,478

(22) Filed: Nov. 24, 2000

(30) Foreign Application Priority Data

Nov. 26, 1999 (JP) .......................................... 11-336675

(51) Int. Cl.$^7$ ................................................ B41J 2/435
(52) U.S. Cl. ...................................... 347/235; 347/250
(58) Field of Search ................................ 347/235, 236, 347/243, 246, 250, 259, 260; 355/40, 41

(56) References Cited

U.S. PATENT DOCUMENTS

| | | | | |
|---|---|---|---|---|
| 4,823,151 A | * | 4/1989 | Miura | 347/235 |
| 5,754,214 A | * | 5/1998 | Okino | 347/229 |
| 6,246,463 B1 | * | 6/2002 | Hamada et al. | 355/41 |

FOREIGN PATENT DOCUMENTS

JP 63-42432 8/1988

* cited by examiner

*Primary Examiner*—Hai Pham
(74) *Attorney, Agent, or Firm*—Oliff & Berridge, PLC

(57) ABSTRACT

A multibeam scanner capable of scanning an image forming area with constant beam amounts of laser beams. The multibeam scanner of the invention performs automatic power control (APC) on each of a plurality of beam emitting points one by one during corresponding time durations, respectively, in a non-image forming area. The laser beam emitted last among the plurality of laser beams is controlled to reach a predetermined beam detecting position within the corresponding time duration. Before scanning the image forming area, the multibeam scanner determines a scan start timing upon the detection of the laser beam emitted at the beam detecting position, which has been stabilized during APC. This arrangement allows the laser diode to avoid wasting time again and again, as rise time for stabilizing the laser beam for performing APC and for identifying the scan start timing, and to secure the time durations as long as possible. It is therefore possible to perform APC against the laser diodes properly during the sufficient time durations and, at the same time, possible to determine the scan start timing precisely by detecting the stabilized laser beam.

17 Claims, 8 Drawing Sheets

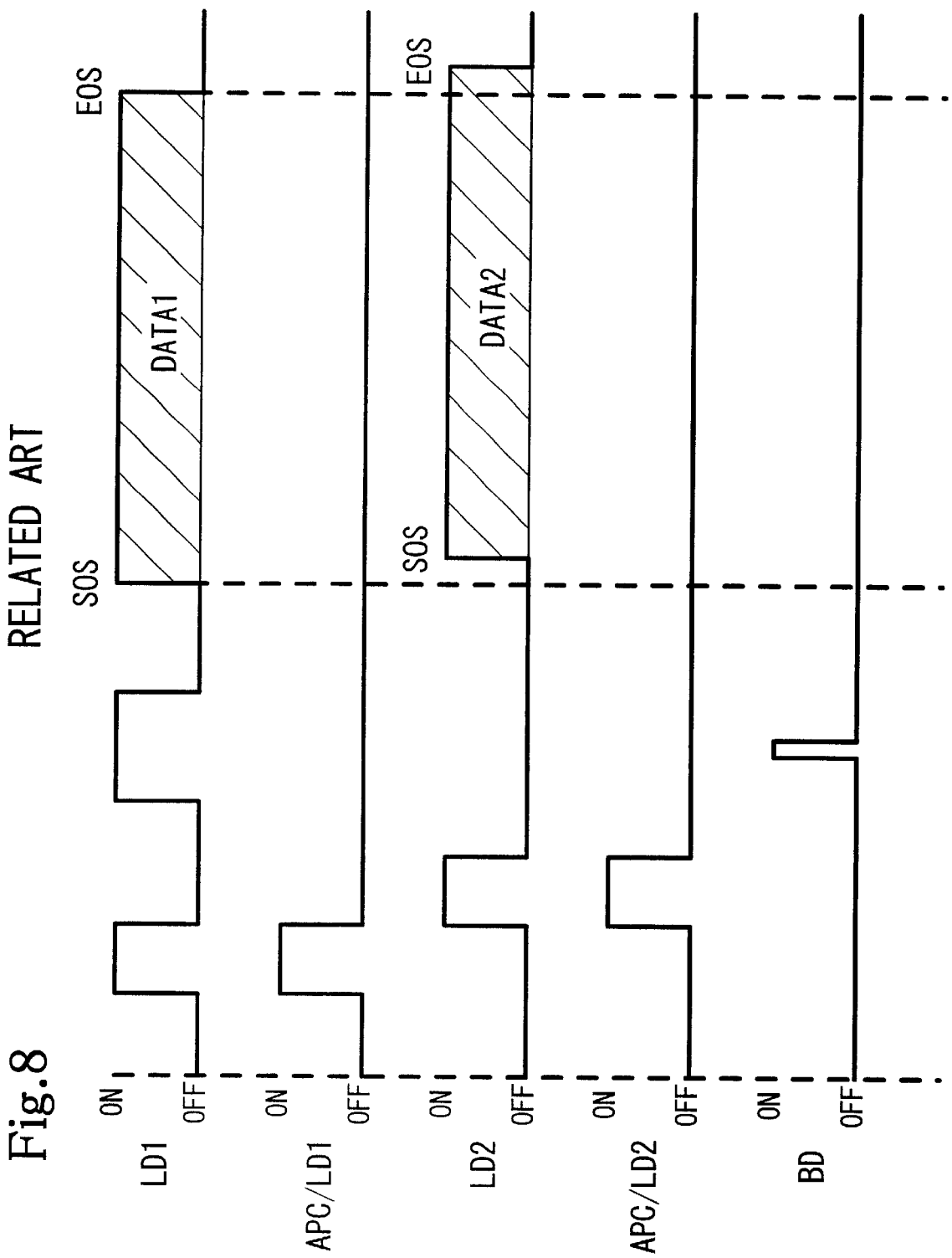

MULTIBEAM SCANNER

BACKGROUND OF THE INVENTION

1. Field of Invention

The invention relates to a multibeam scanner capable of scanning with constant light amounts of laser beams at a high scan cycle.

2. Description of Related Art

As is well-known in the art, a laser beam scanner is put to a number of uses. For example, a laser printer uses a laser beam scanner comprising a laser diode for emitting a laser beam. The laser beam scanner modulates the laser beam based on image signal and deflects the modulated laser beam by using a deflector, such as a polygon mirror, thereby sequentially scanning a photosensitive medium with the laser beam in a main-scanning direction to form a scanning line on the photosensitive medium. At the same time, the laser beam scanner moves the photosensitive medium in a moving direction opposite to a sub-scanning direction to form successive scanning lines. In such a scanning operation, a latent image is formed on the photosensitive medium, developed with toner as a visible image and, then, transferred to a recording sheet by a fixing unit.

However, the laser diode has a fundamental difficulty in stabilizing the light amount emitted. Even if the laser diode is driven with a constant driving current, the temperature of the laser diode increases due to its light emission. The luminous efficiency of the laser diode decreases with the temperature increase.

Therefore, in order to overcome such a drawback, there is performed, as disclosed in Japanese Patent Application No. 63-42432, automatic power control (APC) for feeding a driving current to the laser diode, so that the laser diode always emits the laser beam of appropriate light amount. More specifically, in APC, a control circuit controls the laser diode to emit the laser beam, whereat a photoreceptor detects the emitted laser diode and determines the light amount of the laser beam to give a feedback on the light amount to the control circuit. Upon reception of the feedback, the control circuit properly controls a constant-current circuit to feed an appropriate driving current based on the received feedback, so that the laser diode emits a laser beam of appropriate light amount.

Further, there is provided a beam detector (BD) positioned a predetermined distance before the scan start position in the laser scanner. The BD enables the start of scanning with the laser beam, deflected by the deflector at high speed, on the photosensitive medium. After a predetermined time duration has elapsed since the timing at which the BD detected the laser beam, the laser beam scanner starts scanning the photosensitive medium with the laser beam modulated based on image signals. As the BD only detects a laser beam of more than a threshold light amount, the variations in light amounts of the laser beam may cause a detection fault to destroy the above-mentioned timing. It is therefore preferable that such scan start timing detection is performed by the BD after completing APC.

There is enough time for a single-beam scanner comprising a single laser diode, which has been mentioned above, to perform APC and to detect the scan start timing after finishing forming a scanning line and before starting to form a next scanning line.

Against the above-described backdrop, there has been recently proposed a multibeam scanner that comprises a plurality of laser diodes for emitting a plurality of laser beams simultaneously. This multibeam scanner has an advantage of scanning the photosensitive medium with the laser beams, along a plurality of scanning lines, in the main-scanning direction simultaneously, and thereby is capable of exposing the photosensitive medium in a very short time.

The multibeam scanner may have therein a plurality of photoreceptors to detect the respective light amounts of the plurality of laser beams. It is, however, still difficult for the multibeam scanner to detect the light amounts of the laser beams while avoiding interference between the laser beams, because the laser beams are emitted in very close proximity to each other. The multibeam scanner will have to have an extremely complicated structure to resolve the above-mentioned problem.

The multibeam scanner can have a simple structure with a single BD, but cannot perform APC for all the laser diodes simultaneously. Thus, it is necessary to perform APC separately for every laser diode as disclosed in, for example, Japanese Patent No. 63-42432. FIG. 8 is a timing chart illustrating control timing for such a conventional multibeam scanner. The horizontal axis in FIG. 8 represents elapsed time. "SOS (start of scanning)" and "EOS (end of scanning)" stand for the start timing and the end timing of scanning, respectively. Further, timings for switching on and off laser diodes LD1, LD2 to emit laser beams are represented under headings of "LD1" and "LD2", respectively. Timings of performing APC for the LD1 and LD2 are represented under headings "APC/LD1" and "APC/LD2", respectively, and the timing at which the BD detects the laser beam is represented under a heading of "BD".

As shown in FIG. 8, in the case where there are secured time durations separately for performing APC for the LD1 and LD2 and a time duration of BD beam detection, it is inevitable that the time durations for performing APC are shortened. Accordingly, the multibeam scanner does not have enough time to perform APC to precisely determine driving currents for the LD1 and LD2, and is incapable of stabilizing the laser beams emitted therefrom. There have been attempts to work around such a problem, in terms of circuitry of the multibeam scanner, by providing an A/D converter. However, this complicates the structure of the multibeam scanner and, at the same time, makes its cost-performance worse.

Also, in the case where the multibeam scanner scans at short scan cycle by, for example, speeding up the rotation of polygon mirror, the multibeam scanner does not get sufficient time for performing APC for the laser diodes. Thus, the laser beams will not be sufficiently stabilized.

SUMMARY OF THE INVENTION

The invention has been developed to resolve the above-mentioned and other problems, and especially to provide a multibeam scanner capable of scanning with laser beams with steady light amounts at a high scan cycle.

According to the invention, there is provided a multibeam scanner for scanning an image forming area with a plurality of laser beams and forming a plurality of scanning lines corresponding to the plurality of laser beams, comprising:

a plurality of beam emitting points that emit a plurality of laser beams, respectively;

a scan position changing unit that changes scan positions which the laser beams scan in the image forming area and in a non-image forming area;

a timing controller that controls, in synchronism with the scan position changing unit, each of the plurality of beam emitting points to emit the laser beam during a respective beam emitting period one by one in the non-image forming area, the timing controller controlling the beam emitting point that last emits the laser beam among the plurality of the beam emitting points to emit the laser beam at a predetermined beam detecting position in the non-image forming area during its beam emitting period;

a photoreceptor that detects each of the laser beams emitted one by one under the control of the timing controller, and outputs a beam amount signal indicating a beam amount of the laser beam;

a beam amount controller that controls, based on the corresponding beam amount signals, the beam amounts of the laser beams emitted by the beam emitting points, respectively;

a scan start timing detector that detects the last emitted laser beam at the predetermined beam detecting position in the non-image forming area, and determines a scan start timing based upon the detection of the laser beam at the beam detecting position; and a scan controller that controls the beam emitting points, based on the scan start timing, to emit the laser beams, each of which beam amounts being controlled by the beam amount controller, thereby forming the plurality of scanning lines in the image forming area.

According to the invention, the multibeam scanner performs APC on each of the plurality of beam emitting points one by one during corresponding time durations, respectively, in the non-image forming area. The laser beam emitted last among the plurality of laser beams is controlled to reach the beam detecting position within the corresponding time duration by the timing controller. The beam detector detects the laser beam emitted at the beam detecting position, which has been stabilized during APC, and determines the scan start timing with very high precision.

In other words, the time duration provided to the beam emitting point that last emits the laser beam under the control of the timing controller, is used not only for performing APC for that last emitted laser beam, but also for identifying the scan start timing by using the beam detector. This allows the laser diodes to avoid wasting time again and again, as rise time for stabilizing the laser beam, and to secure the time durations as long as possible. It is therefore possible to perform APC against the laser diodes properly during the sufficient time durations and, at the same time, possible to determine the scan start timing precisely by detecting the stabilized laser beam.

BRIEF DESCRIPTION OF THE DRAWINGS

The above and other objects, features and advantages of the invention will become more apparent from the following description of an exemplary embodiment taken in connection with the accompanying drawings in which:

FIG. 8 is a timing chart illustrating control timing of a conventional multibeam scanner.

DETAILED DESCRIPTION OF PREFERRED EMBODIMENTS

An explanation will be given of a multibeam scanner in accordance with the invention based on the following exemplary embodiment. Herein, the exemplary embodiment is described with reference to a laser scanner 12 provided in a laser printer 1.

Figure 2:
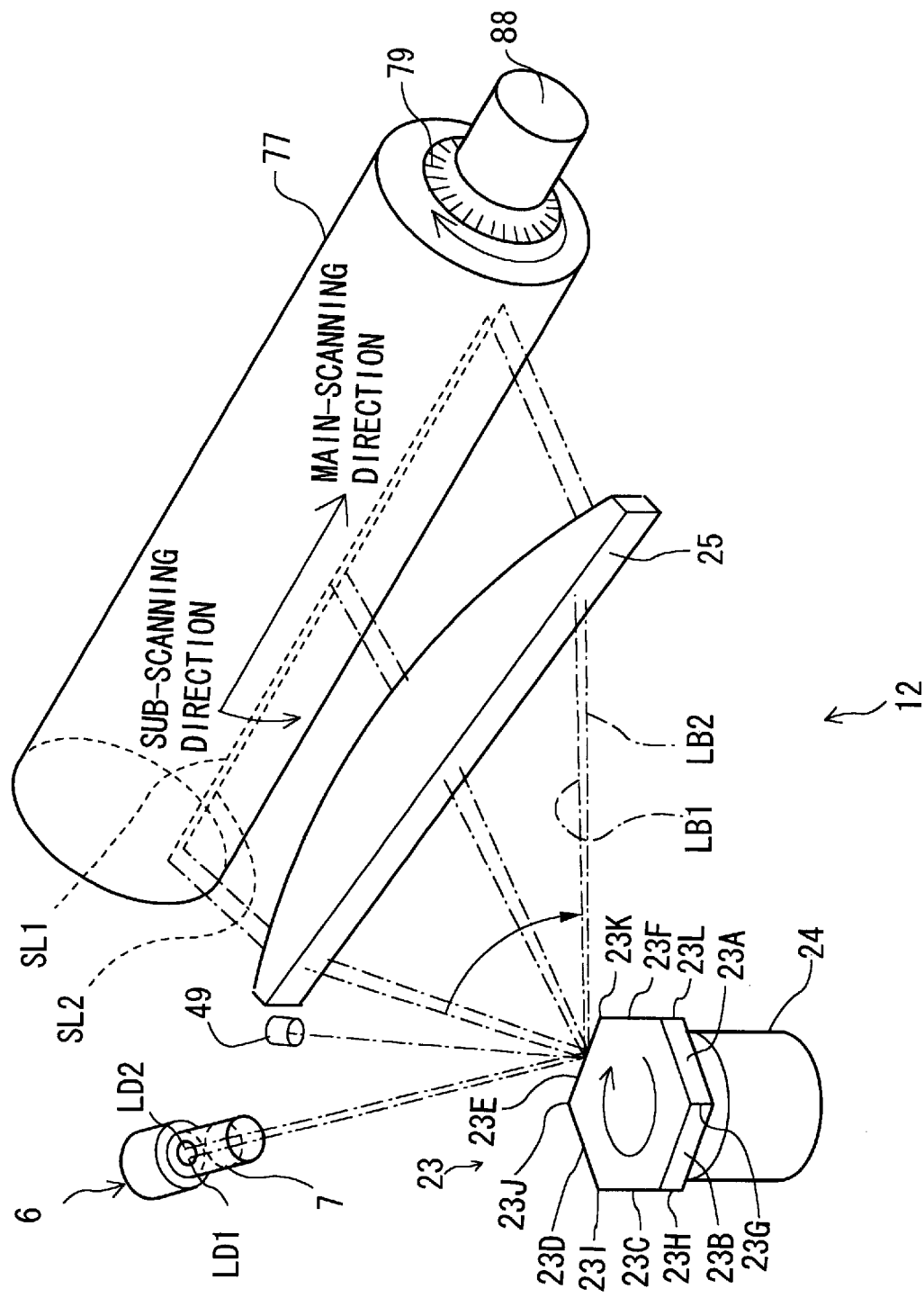
FIG. 2 is a perspective view of a laser scanner of the laser printer.

Firstly, the structure of the laser scanner 12 will be explained with reference to FIG. 2. FIG. 2 is a perspective view of the laser scanner 12. The laser scanner 12 comprises a semiconductor laser element 6, a collimating unit 7, a polygon mirror 23, an fθ lens 25 and a photosensitive drum 77.

The semiconductor laser element 6 has two laser diodes LD1, LD2 that emit laser beams LB1, LB2, respectively. Although, the laser diodes LD1, LD2 are integrated as a single unit, that has two light emitting points in this embodiment, the laser diodes LD1, LD2 may be formed separately so that each has one light emitting point. Hereinafter, the laser diodes LD1, LD2 are just referred to as LD, if it is not necessary to distinguish LD1, LD2. Also, the laser beams LB1, LB2 may be referred to as LB for the same reason.

The collimating unit 7 has therein a collimate lens (not shown in figures) that collimates the laser beams LB1, LB2, and a cylindrical lens (not shown in figures) that converges the collimated laser beams LB1, LB2 to the polygon mirror 23. The polygon mirror 23 is shaped in a hexagonal prism, having six reflective surfaces 23A to 23H and edges 23G to 23L (one edge between two reflective surfaces). The polygon mirror 23 is driven by a polygon mirror drive motor 24 so as to rotate in a direction indicated by an arrow of FIG. 2 (in a clockwise direction when FIG. 2 is viewed from the above) at high speed, thereby deflecting the laser beams LB1, LB2 at a constant angular velocity.

The laser scanner 12 scans the photosensitive drum 77 in a mainscanning direction (indicated by an arrow of FIG. 2), thereby forming a scanning line on the photosensitive drum 77 via a scanning line SL on a reflective surface of the polygon mirror 23. (Hereinafter, a scanning operation for forming a scanning line SL in the main-scanning direction is referred to as main-scanning operation.) That is, each scanning line SL begins from its leading end corresponding to a beam spot of the laser beam LB deflected at a forwardmost edge portion of the reflective surface along the rotation of the polygon mirror 23. As the deflection angle of the laser beam LB varies with the rotation of the polygon mirror 23, the laser beam LB scans along the scanning line SL. Then, the scanning line SL ends at its rear end corresponding to a beam spot of the laser beam LB deflected at a rearmost edge portion of the reflective surface along the rotating direction of polygon mirror 23.

The laser diode LD is switched on at the leading end of the scanning line SL and is switched off at the rear end of the scanning line on every main-scanning operation, because of the reason described below.

If the high-intensity laser beams LB1, LB2 reach any of the edges 23G to 23L, the laser beams LB1, LB2 are reflected diffusely to produce a stray light. The stray light may reach the photosensitive drum 77 to cause a deterioration in image quality. The edges 23G to 23L could be plane-shaped (sharp edged) or arc-shaped, but the stray light is produced on the edges regardless of the shape of the edge. If the edges 23G to 23L are arc-shaped, there will be a greater possibility of stray light being produced because the arc-shaped edges have larger surface areas than the plane-shaped edges.

According to the invention, the laser diodes LD1, LD2 are controlled by a LD1 control circuit 31 and a LD2 control circuit 41, respectively, so as not to emit the laser beams LD1, LD2 during a predetermined time duration ti in which the laser beams LD1, LD2 are supposed to reach any of the edges. Such makes it possible to avoid producing the above-mentioned stray light and to achieve high image quality.

The fθ lens 25 allows the laser beams LD1, LD2, which have been deflected by the polygon mirror 23 at a constant angular velocity, to pass therethrough, thereby moving the laser beams LD1, LD2 on the photosensitive drum 77 at a constant linear velocity in the main-scanning direction. The laser beams LD1, LD2 move on the photosensitive drum 77 at substantially concurrent timings to form two adjacent scanning lines SL1, SL2.

The laser beam LD1 is detected by a beam detector (BD) 49, before starting to scan the photosensitive drum 77 in the main-scanning direction, so as to transmit, to a controller 9, a signal indicative of a reference time for identifying the scan start position. Then, the controller 9 controls, by a photosensitive drum drive motor 88 comprised of an actuator including a stepping motor, the photosensitive drum 77 to rotate in a moving direction opposite to a sub-scanning direction (indicated by an arrow of FIG. 2) at a timing synchronized with the main-scanning operation. By this, the laser scanner 12 scans the photosensitive drum 77 in the sub-scanning direction with the laser beams LD1, LD2. The entire photosensitive drum 77 is exposed to form a latent image thereon, while being scanned in the mainand the sub-scanning directions with the laser beams LD1, LD2.

The rotation speed of the photosensitive drum 77 is electrically converted by an optical rotary encoder 79 to give feedback to the controller 9, so that the controller 9 controls the rotation of the photosensitive drum 77. The optical rotary encoder 79 is comprised of a photodetector having a pair of phototransmitter and a photoreceiver, and a round plate is perforated with slits at predetermined angular intervals and is provided between the phototransmitter and the photoreceiver. While the round plate rotates in synchronism with the photosensitive drum 77, the phototransmitter emits a light and the photoreceiver receives the light passing through the slits from the phototransmitter. Thus, the optical rotary encoder 79 gains information about the rotation speed of the photosensitive drum 77, and converts the information into pulses of electrical signals.

Figure 3:
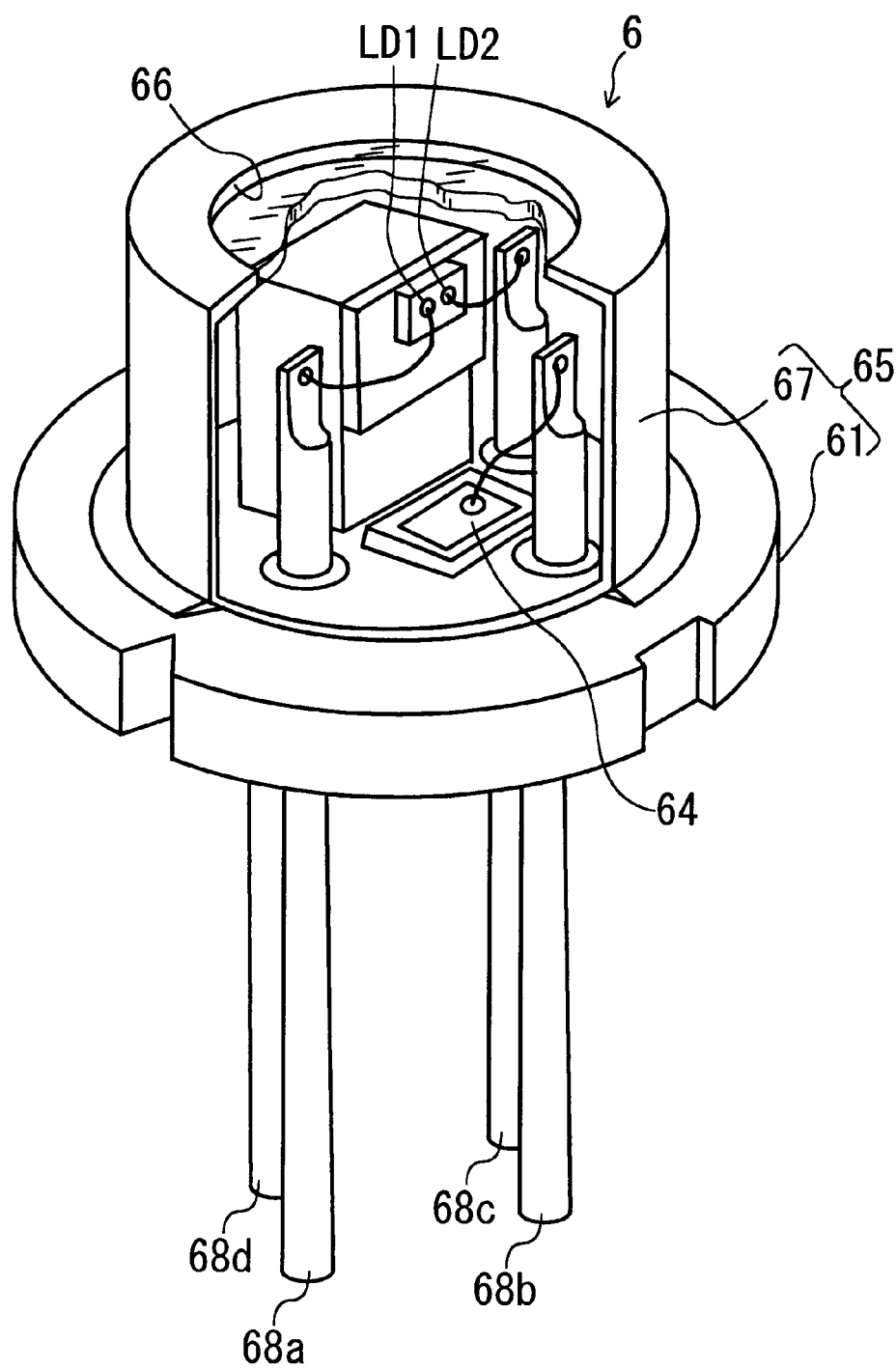
FIG. 3 is a fragmentary view of a semiconductor laser of the laser scanner.

FIG. 3 is a fragmentary view of the semiconductor laser element 6. Herein, the laser beam LD is emitted upward as shown in FIG. 3. The semiconductor laser element 6 comprises a metal case 65 having a metal stem 61 and a cap 67. The metal case 65 includes therein the laser diodes LD1, LD2, and a pin-type photodiode 64. The laser diodes LD1, LD2 are oscillated, respectively, with the driving currents that have been supplied from the constant-current circuits 34, 44 and modulated by the modulation circuits 35, 45, thereby emitting the laser beams LB1, LB2. A hole 66 is formed in the cap 67, so that the laser diodes LD1, LD2 emit the laser beams LB1, LB2 through the hole 66. Metal pins 68A to 68D are inserted into the metal stem 61 for connectivity.

Next, the procedure for detecting the light amounts of the laser beams LB1, LB2 will be explained below in accordance with the invention. When the laser beams LB1, LB2 are emitted from the semiconductor laser element 6, some of the laser beams LB1, LB2 are guided to the photodiode 64. The photodiode 64 detects the laser beams LB1, LB2 guided thereto, and determines the total light amounts of the laser beams LB1, LB2 respectively. The photodiode 64 converts the detected light amounts into electrical signals as light amount signals, and feeds the light amount signals to the controller 9.

In this embodiment, the photodiode 64 is configured so as to detect both of the laser beams LB1, LB2 in turn, so that the semiconductor laser element 6 becomes compact in size. It is however necessary to switch on one of the laser diodes LD1, LD2 while switching off the other laser diode, because the photodiode 64 can not detect the light amounts of the laser beams LB1, LB2 individually at the same time.

In addition, the laser beams LB1, LB2 have to be stabilized so that the photodiode 64 precisely detects the light amounts of the laser beams LB1, LB2. Soon after applying a driving current, the laser diode LD does not emit the laser beam LB in a perfect square-wave form, and requires some rise time to emit a stabilized laser beam LB.

Further, the controller 9 (described later in detail) comprises peak hold circuit 33, 34 and constant-current circuits 34, 44, with capacitors of constant capacitances. In this embodiment, the peak hold circuit 33 and the constant-current circuit 34 share one capacitor, while the peak hold circuit 34 and the constant-current circuit 44 share another capacitor. As explained above, the photodiode 64 outputs the light amount signal (that is, voltage) based on the detected light amount of the laser beam. The peak-hold circuits 33, 43 hold the light amount signals during one mainscanning operation, so as to charge the capacitors with the voltages. The constant current circuits 34, 44 have comparators that compare the charged voltages with reference levels, respectively, and output control signals for applying driving currents of appropriate amounts. With such an arrangement, it takes some time to charge the capacitors with the voltages of the light amount signals. It is therefore preferable to determine the light amount of the stabilized laser beams LB, after finishing charging the capacitors with the voltages.

When the laser diode LD is actuated with the driving current, the laser diode LD converts most power of the driving current into laser light with high efficiency, but also converts the rest into heat. The heat increases the temperature of the laser diode LD itself. As a result, the luminous efficiency of the laser diode relative to the driving current decreases with the temperature increase. That is, the light amount of the laser beam LB gradually decreases over time, even if the laser diode LD is driven with the constant driving current. It is therefore essential to actuate the laser diodes LD1, LD2 one by one with a predetermined time difference therebetween, and, to detect the light amounts of the stabilized laser beams LB1, LB2. This makes it possible to detect the light amount of both of the laser beams LB1, LB2 that are stabilized at the same temperature condition satisfied after a fixed time period from actuating the laser diodes LD1, LD2.

Figure 4:
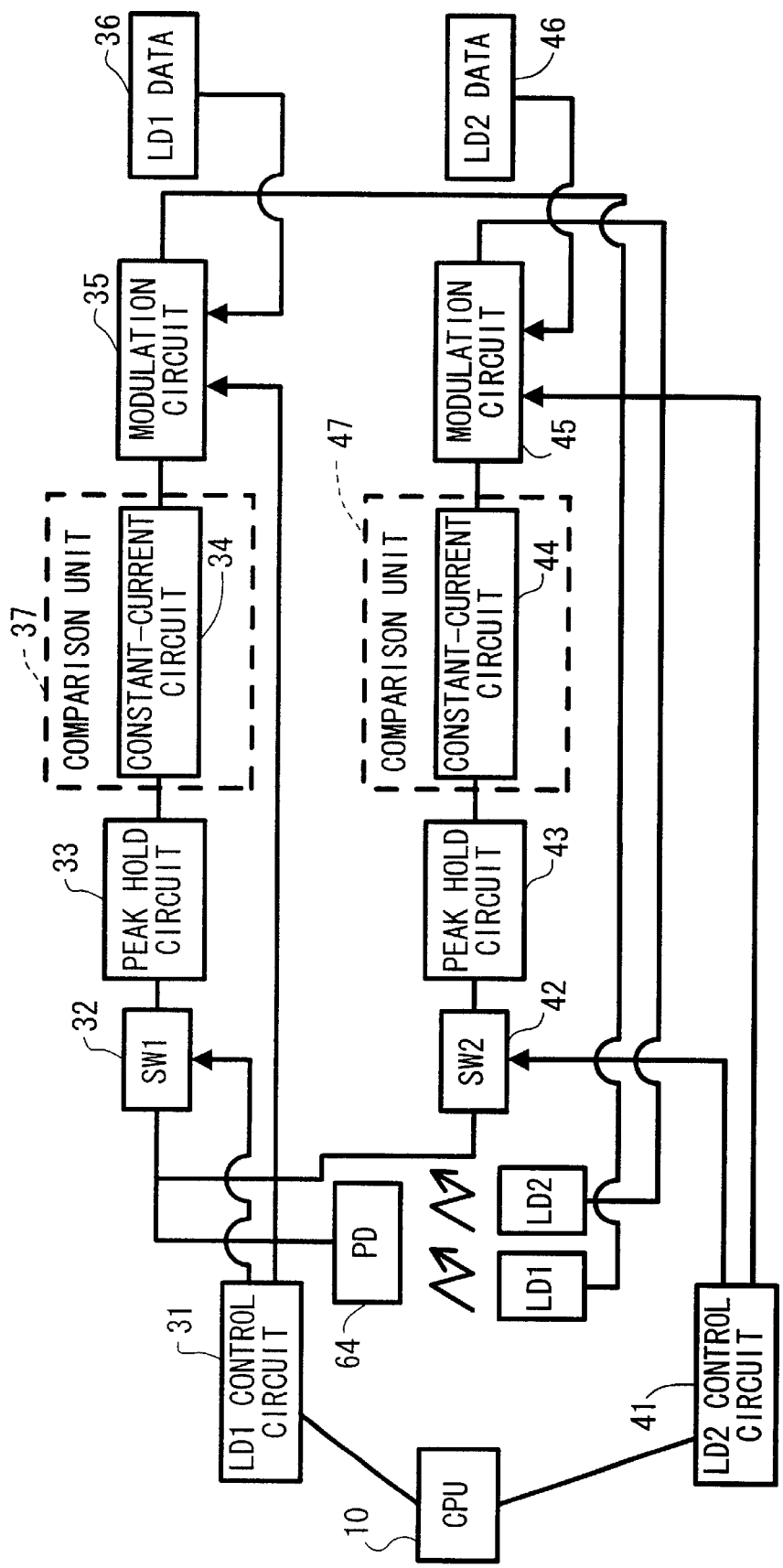
FIG. 4 is a block diagram of a controller that controls light amounts emitted by laser diodes provided in the laser scanner.

FIG. 4 is a block diagram of the controller 9 that executes APC to control the light amounts of the laser beams LB1, LB2. The controller 9 comprises a LD1 control circuit 31, a LD2 control circuit 34, switches SW1 32, SW2 42, the peak hold circuits 33, 43, the constant-current circuits 34, 44, and modulation circuits 35, 45. As described above, in this embodiment, the peak hold circuit 33 and the constant-current circuit 34 share one capacitor, while the peak hold circuit 43 and the constant-current circuit 44 share another capacitor. The constant-current circuits 34, 44 have capacitors therein, respectively.

The LD1 control circuit 31 is connected to a CPU 10 of the controller 9. The LD1 controls a switch SW1 32, provided for switching input of the light amount signal of the laser beam LB1 from the photodiode 64 into a peak hold circuit 33, at a time of performing APC against the laser diode LD1. The LD2 control circuit 41 is also connected to the CPU 10, and controls a switch SW2 42, provided for switching input of the light amount signal of the laser beam LB2 from the photodiode 64 into a peak hold circuit 43, at a time of performing APC against the laser diode LD2. The LD 1 control circuit 31 controls the switch SW1 32 to be switched on, while the LD2 control circuit 41 controls the switch SW2 42 to be switched off. On the other hand, the LD1 control circuit 31 controls the switch SW1 32 to be switched off, while the LD2 control circuit 41 controls the switch SW2 42 to be switched on.

Although the LD1 control circuit 31 and the LD2 control circuit 41 are provided dependently, as shown in FIG. 4, in this embodiment, it is possible to provide a single LD control circuit that serves as both of the LD1 control circuit 31 and the LD2 control circuit 41. Alternatively, the CPU 10 may incorporate therein the functions of the LD1 control circuit 31 and the LD2 control circuit 41.

The peak hold circuit 33 holds a peak value of the light amount signal of the laser beam LB1 to charge the capacitor with the voltage. The constant-current circuit 34 compares, by using the comparator, the charged voltage with a reference value and, thus, provides a comparison unit 37. The reference value has been previously determined so as to make the light amount of the laser beam LB stabilized as a fixed amount. If the charged voltage is larger than the reference value, the constant-current circuit 34 outputs a control signal to apply a smaller driving current to the laser diode LD1. On the other hand, if the charged voltage is smaller than the reference value, the constant-current circuit 34 outputs the control signal to apply a larger driving current to the laser diode.

The peak hold circuit 33 holds the peak value during one mainscanning operation before performing the next APC. In other words, APC is performed after every main-scanning operation, so that the laser diode LD1 is applied with an appropriate amount of the driving current. It is therefore possible that the laser diode LD1, driven with the appropriate driving current, always emits the laser beam LB1 of an appropriate light amount.

The modulation circuit 35 receives the driving current and actuates the laser diode LD1 at a predetermined timing, being controlled by the controller 9, so as to perform APC against the laser diode LD1 and to detect the laser beam LB1 by using the beam detector BD 49 for identifying the scan start position. The modulation circuit 35 also modulates the received driving current based on LD1 data, by using a switching circuit provided therein, for forming an image on the photosensitive drum 77. The LD1 data indicates scanning positions, and has previously been generated based on image data and input into the control circuit 9.

The peak hold circuit 43, the constant-current circuit 44 (which provides comparison unit 47) and the modulation circuit 45 perform the same as the peak hold circuit 33, the constant-current circuit 34 and the modulation circuit 35, respectively. Thus, a detailed explanation of the peak hold circuit 43, the constant-current circuit 44 and the modulation circuit 45 will be omitted to avoid duplication.

Figure 5:
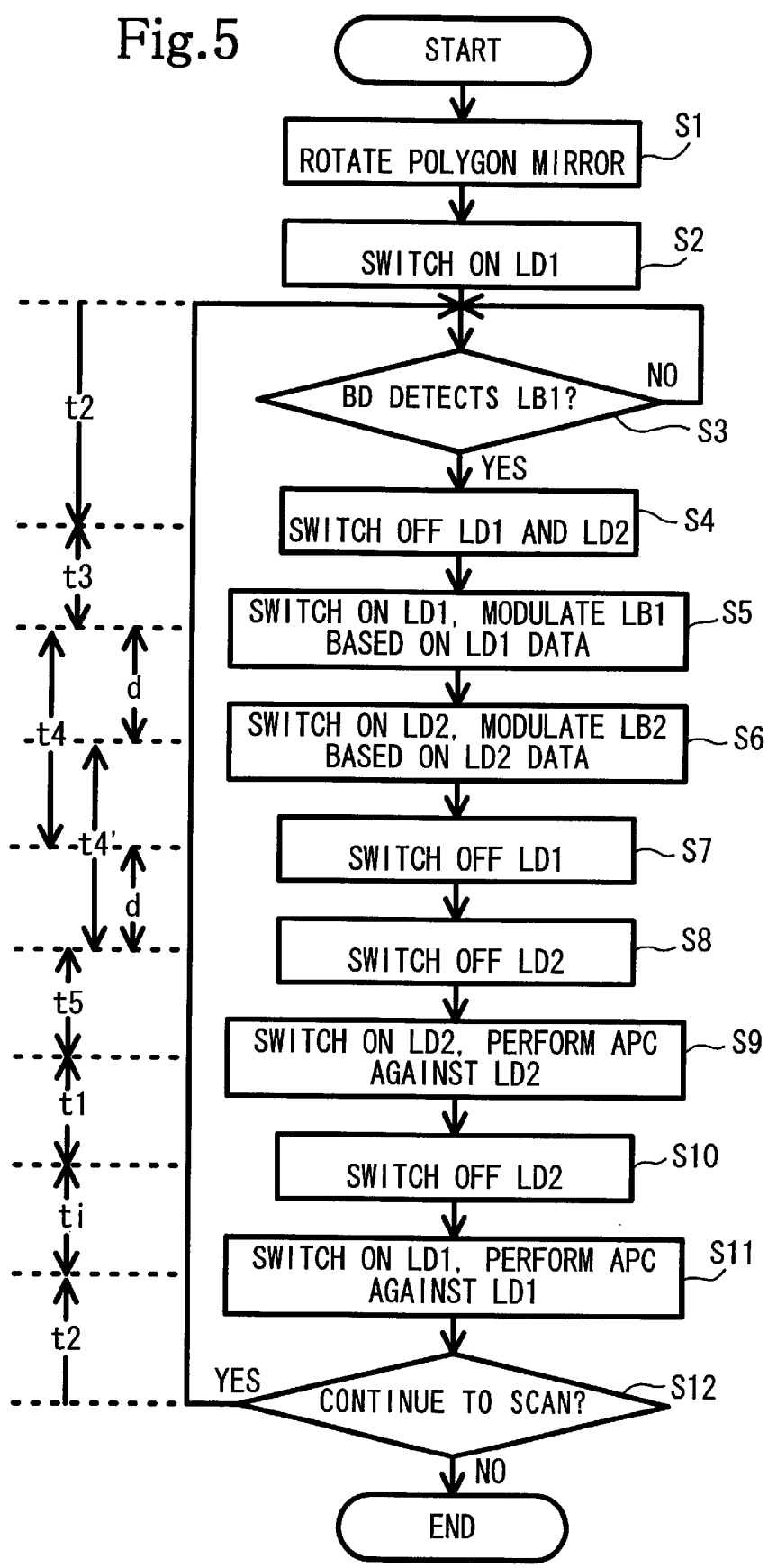
FIG. 5 is a flowchart for controlling the laser scanner.
Figure 6:
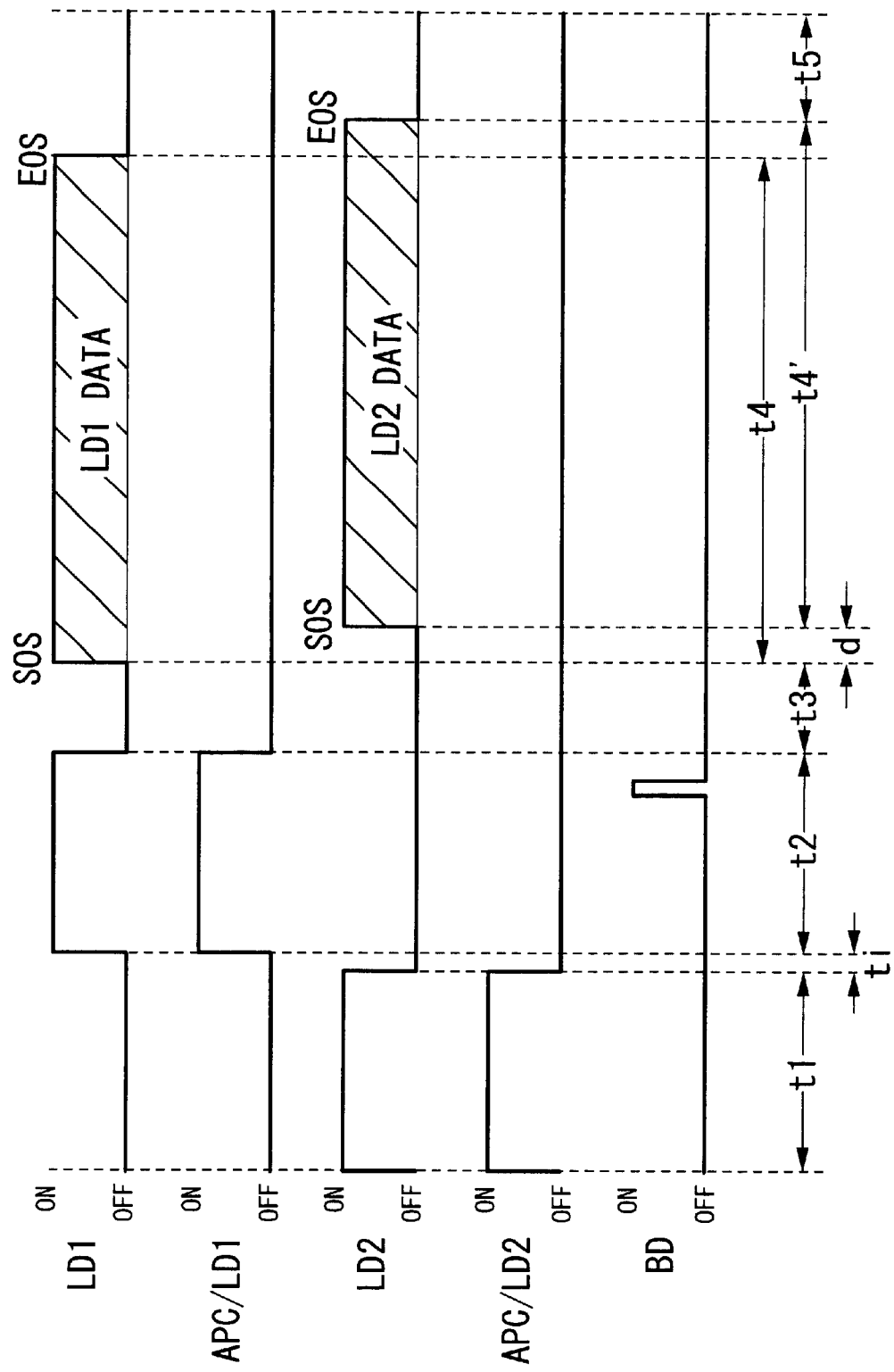
FIG. 6 is a timing chart illustrating control timing of the laser scanner according to the invention.

The procedure of controlling the laser scanner 12 will be explained with reference to FIGS. 5 and 6. FIG. 5 is a flowchart for controlling the laser scanner 12. FIG. 6 is a timing chart illustrating control timing of the laser scanner 12 according to the invention. As in FIG. 8, the horizontal axis in FIG. 6 represents elapsed time, and "SOS (start of scanning)" and "EOS (end of scanning)" stand for the start timing and the end timing of scanning, respectively. Further, the timings of switching on and off laser diodes LD1, LD2 to emit laser beams are represented under headings of "LD1" and "LD2", respectively, the timings of performing APC against the LD1, LD2 are represented under headings "APC/LD1", "APC/LD2", respectively, and the timing t2 at which the BD 49 detects the laser beam LB1 is represented under a heading of "BD". Time durations t1 to t5, ti and d, shown in FIG. 6, of switching on and off the laser diodes LD1, LD2 are also indicated in FIG. 5 corresponding to the operation steps S1 to S12.

First, the polygon mirror 23 is driven by the polygon mirror drive circuit 24 in step S1, when the laser scanner 12 is turned on. The polygon mirror 23 continues rotating at fixed high revolutions until the entire scanning operation is finished. Then, the laser diode LD1 is switched on to emit the laser beam LB1 in step S2. In step S3, it is ensured whether the BD 49 detects the laser beam LB1, which moves by being deflected by the polygon mirror 23. There is a continuation of step S3 until the BD detects the laser beam LB1. If Yes in step S3, the laser diodes LD1, LD2 are switched off, over a time duration t3, by the LD1 control circuit 31 and the LD2 control circuit 41 via the modulation circuits 35, 45 in step S4. The controller 9 determines the timing at which the BD 49 detects the laser beam LB1 (that is, the beginning of the time duration t3) as scan start reference timing. In other words, the controller 9 recognizes positioning of the laser beam LB1 with reference to the scan start reference timing and an elapsed time after the scan start reference timing, as the laser beam LB1 moves at constant linear velocity.

Figure 7:
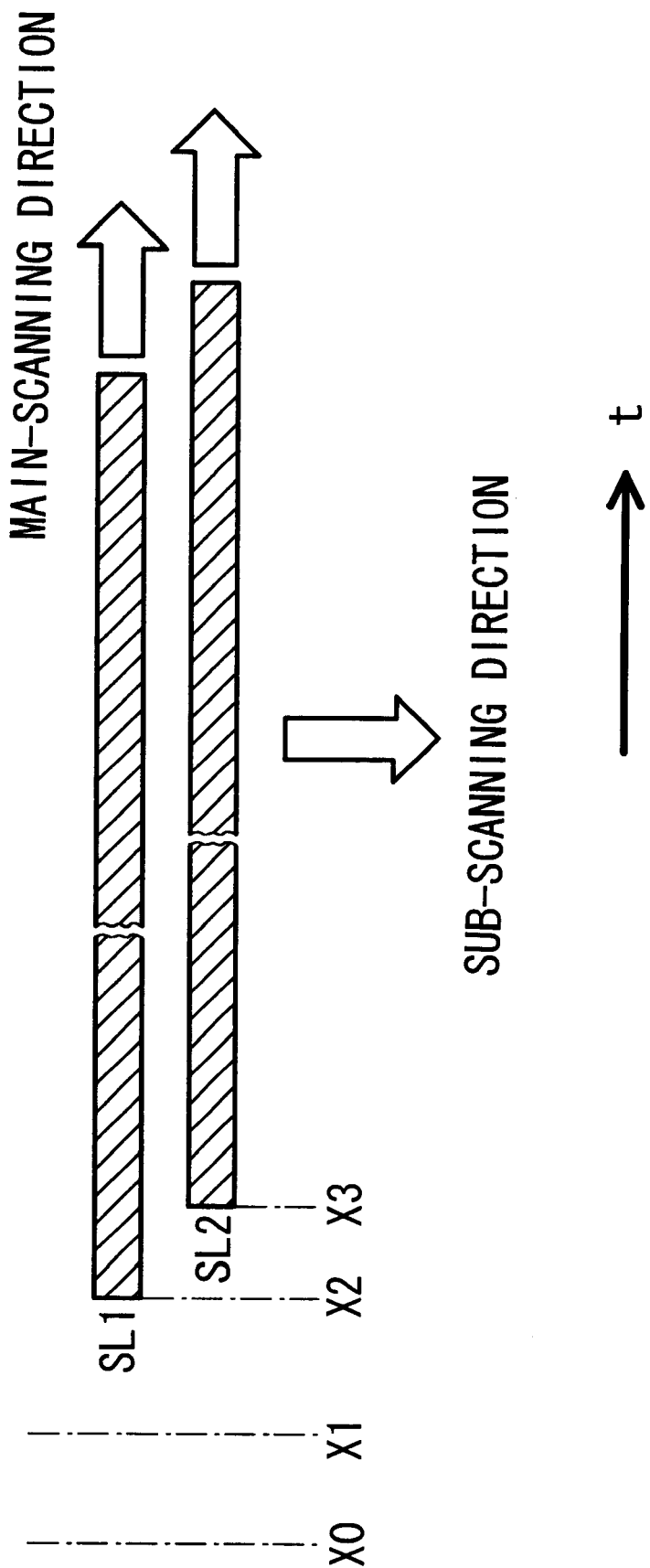
FIG. 7 schematically shows scanning lines formed on a photosensitive drum of the laser scanner.

There is a reason for switching off the laser diodes LD1, LD2 during the time duration t3, as described below. FIG. 7 schematically shows a time line of the scanning lines SL1, SL2 that are respectively formed by the laser beams LB1, LB2 on the photosensitive drum 77. Herein, X0 and X1 express a time position of the BD 49 and a time position of one edge of the photosensitive drum 77, respectively. Further, X2 and X3 express time positions of the leading ends of the scanning lines SL1 and SL2, respectively. In other words, the photosensitive drum 77 includes an image forming area in which the scanning lines SL1 and SL2 are formed. As the photosensitive drum 77 has a width larger than a width of a recording sheets, the photosensitive drum 77 also includes a part of a non-image forming area between X1 and X2 and between the rear end of the scanning line SL and the other edge of the photosensitive drum 77 (not shown in FIG. 7). The non-image forming area located on the photosensitive drum 77 partially faces and contacts with a side margin on the recording sheet while transferring an image of developing agent T from the photosensitive drum 77 to the recording sheet.

The laser beam LB emitted outside of the photosensitive drum 77 (that is, the laser beam emitted between times X0 and X1) produces a stray light. This stray light causes a deterioration in image quality. Further, the laser beam LB emitted between times X1 and X2 exposes the non-image forming area, whereby the exposed non-image forming area becomes dirty with developing agent T. In addition, such a dirty non-image forming area soils the side margin of the recording sheet against a user's will. Therefore, the laser diodes LD1, LD2 need to be switched off between times X0 and X2, namely during the time duration t3 after the BD 49 detects the laser beam LB1.

By the end of the time duration t3, the polygon mirror 23 has rotated until the laser beam LB1 reaches X2. Thus, in step S5, SOS is provided for the laser diode LD1, and the laser diode LD1 is switched on to emit the laser beam LB1. The laser beam LB1 is modulated by the modulation circuit 35 based on the LD1 data 36, thereby scanning the photosensitive drum 77 to form the scanning line SL1.

The polygon mirror 23 rotates during a time duration d after SOS provided for the laser diode LD1, until the laser beam LB2 reaches time X3. Then, in step S6, SOS is provided for the laser diode LD2, and the laser diode LD2 is switched on to emit the laser beam LB2. The laser beam LB2 is modulated by the modulation circuit 45 based on the LD2 data 46, thereby scanning the photosensitive drum 77 to form the scanning line SL2. The scanning lines SL1, SL2, shown in FIG. 7, are formed on the photosensitive drum 77, respectively, while scanning with the laser beams LB1, LB2 over time durations t4 and t4'. At the end of the time duration t4, the laser diode LD1 is switched off in step S7. In step S8, the laser diode LD2 is switched off at the end of the time duration t4'. Herein, the time durations t4 and t4' are shifted in time by the time duration d, but are equal to each other because the scanning lines SL1 and SL2 are identical in length.

The laser diodes LD1 and LD2 are controlled to be switched off during a time duration t5, so as not emit the laser beams LB1 and LB2 on a non-image forming area defined between the rear end of the scanning line SL and the edge of the photosensitive drum 77, for the same reason explained above with reference to FIG. 7.

After a lapse of the time duration, in step S9, the LD2 control circuit controls to switch on the laser diode LD2, at the same time, controls to switch on the switch SW2 42 to transmit the light amount signal from the photodiode 64 to the peak hold circuit 43. APC is performed against the laser diode LD2 during a time duration t1. When the laser diode LD2 is stabilized, the peak hold circuit 43 holds the peak value of the light amount signal. Then, the laser diode LD2 is switched off in step S10.

After the laser diode LD2 is switched off in step S10, the laser diodes LD1, LD2 are controlled to be switched off, during the time duration ti, so as not to scan the edges 23G to 23L with the laser beams LB1, LB2. The reason for switching off the laser diodes LD1, LD2 during the time duration ti has been already explained above in detail.

In step S11, the LD1 control circuit controls to switch on the laser diode LD1, at the same time, controls to switch on the switch SW1 32 to transmit the light amount signal from the photodiode 64 to the peak hold circuit 33. APC is performed against the laser diode LD1 during a time duration t2. Herein, the time durations t1, t2 are substantially equal in time length to each other. It is ensured whether there exists any further LD1 data 36 and LD2 data 46 in step S12. If No in step S12, the series of scanning operations is finished.

If Yes in step S12, steps S3 to S12 are repeated. In this case, the controller 9 controls the rotation of the polygon mirror 23 so that the laser beam LB1 is deflected by the polygon mirror 23 to reach the BD 49. Therefore, the BD 49 detects the laser beam LB1 in step S3, following APC performed in step S11, within the time duration t2. As the laser beam LB1 has been stabilized to a light amount of more than a threshold level through APC in step S11, the BD 49 can detect the laser beam LB1 precisely. By detecting the scan start reference timing precisely in step S3, it becomes possible to determine SOS against the laser diodes LD1, LD2 with high precision in steps S5, S6.

In the above-mentioned embodiment, the controller 9 controls the laser diodes LD1, LD2 to be switched off during the time duration t1, so as not to emit the laser beams LB1, LB2 on the edges 23G to 23L, while controlling the rotation of the polygon mirror 23. However, for example, the controller 9 could control the rotation of the polygon mirror 23, so that the edges 23G to 23L face to the laser diodes LD1, LD2 during the time duration t5 in which the laser diodes LD1, LD2 are switched off as described above. This also makes possible to not emit the laser beams LB1, LB2 on the edges 23G to 23L, and to not produce a stray light.

According to the invention, as described above, the multibeam scanner 12 performs APC on the laser diodes LD1, LD2 one by one, respectively, in the non-image forming area. In particular, there are provided the generally equal time durations t2, t1 to the laser diodes LD1, LD2 for performing APC. The laser beam LB1 that has been stabilized during APC reaches the BD 49 within the time duration t2, whereby the BD 49 precisely detects the laser beam LB1 for identifying the scan start timing. By using the time duration t2 not only for performing APC against the laser diode LD1 but also for identifying the scan start timing by the BD 49, the multibeam scanner 12 can avoid wasting time again and again, as rise time for stabilizing the laser beam LB1, and can secure the time durations t1, t2 as long as possible. It is therefore possible to perform APC against the laser diodes LD1, LD2 properly during the sufficient time durations t2, t1 and, at the same time, possible to determine the scan start timing precisely by detecting the stabilized laser beam LB1. Moreover, APC is performed against the laser diodes LD1, LD2 under the same temperature condition, as there are provided generally equal time durations t2, t1, respectively. This makes possible to keep a balance between the light amounts of the laser beams LB1, LB2.

Figure 1:
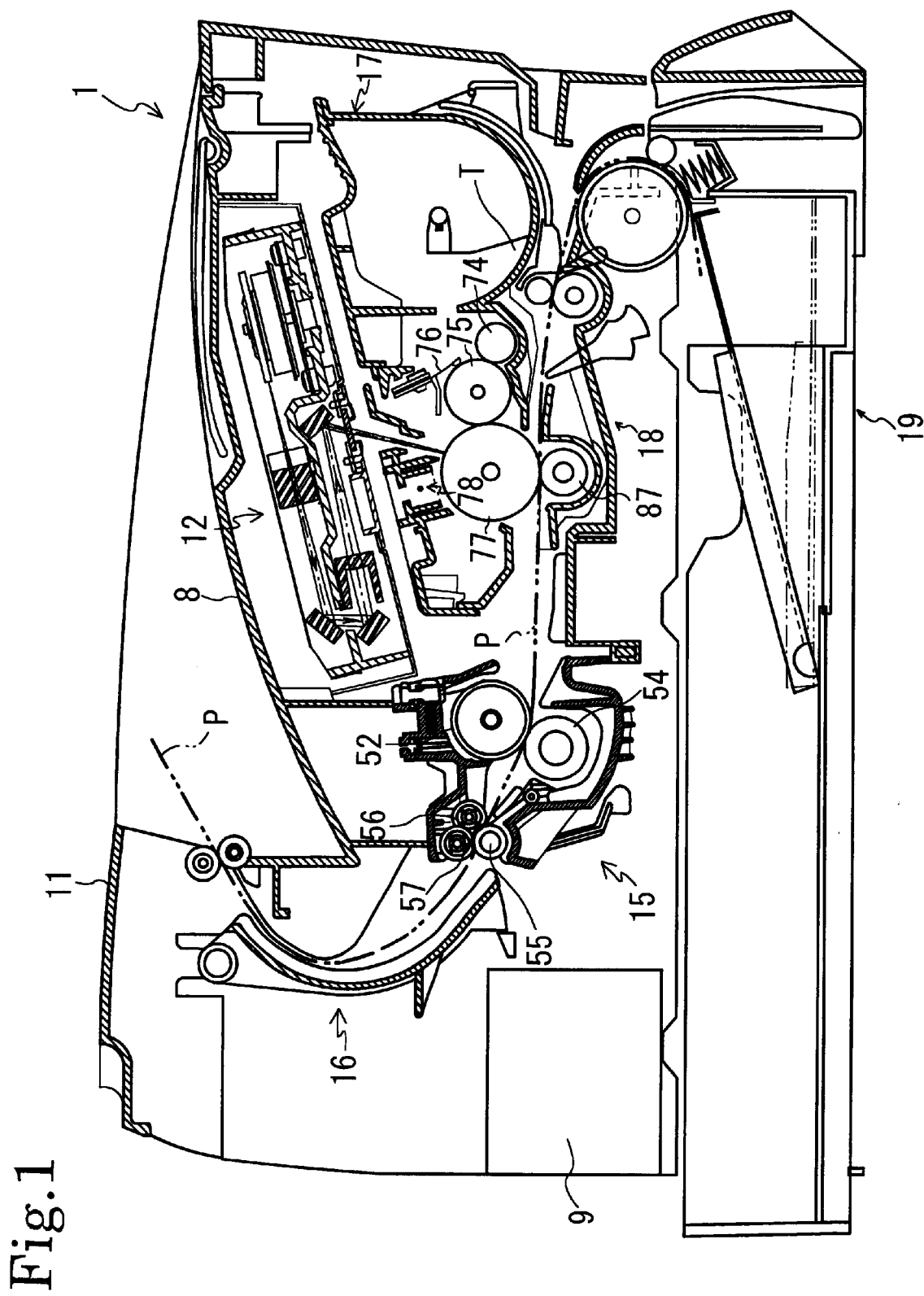
FIG. 1 is a cross-sectional view of a laser printer according to a preferred embodiment of the invention, when viewed in a direction perpendicular to a sheet transport direction.

Finally, the overall structure and the performance of the laser printer 2 will be explained while referring to FIG. 1. FIG. 1 is a cross-sectional view of the laser printer 1 when viewed in a direction perpendicular to a sheet transporting direction and viewed from the left side of the laser printer 1. In FIG. 1, the right side is the front of the laser printer 1, whereas the left side is the rear of the laser printer. The laser printer comprises a body frame 11, a feed unit 19 including a sheet cassette (not shown in figures) in a lower part of the body frame 11, a transport unit 18, a developing unit 17 including the photosensitive drum 77, a transfer roller 87, a fixing unit 15, a discharge unit 16, a sheet stack portion 8 and the laser scanner 12 of the invention. By the body frame 11, the overall shape of the laser printer 1 is formed in a generally parallelepiped shape.

The feed unit 19 holds sheets P in the sheet cassette and feeds a sheet P to the transport unit 18. The transport unit 18 transports the sheet P from the feed unit 19 to an image transfer position located between the photosensitive drum 77 and the transfer roller 87. The laser scanner 12, positioned above the developing unit 17, scans the photosensitive drum 77 with the laser beams LB1, LB2 to form a latent image thereon. The latent image is developed with a developing agent T, thereby forming a visible image. The transfer roller 87 transfers the visible image from the photosensitive drum 77 to the sheet P at the image transfer position. The transport unit 18 further transports the sheet P with the transferred image to the fixing unit 15. The fixing unit 15 heats and pressurizes the sheet P therebetween, so that the image, formed of the developing agent T, is fixed on the sheet P. The discharge unit 16 then discharges the sheet P with the image into the sheet stack portion 8.

The configuration and the performance of the laser printer 1 will be described in more detail below.

The developing unit 17 has the photosensitive drum 77, a developing roller 75 that rotates in contact with the photosensitive drum 77 in a direction opposite to the rotation of photosensitive drum 77, a supply roller 74 that rotates in the same direction to the developing roller 75, a blade 76 provided in contact with the developing roller 75 with a certain pressure, and a charger 78 for charging the photosensitive drum 77 uniformly.

The supply roller 74 has a sponge-like surface, and supplies the developing agent T (in the form of fine particles) to the developing roller 75 by pressing the sponge-like surface against the developing roller 75.

The blade 76 scrapes excessive developing agent T from the developing roller 75, thereby adjusting the amount of the developing agent T on the developing roller 75 appropriately.

The developing roller 75 is a rubber roller comprised of a roller spindle made of metal (such as stainless steel) and a conductive material provided around the roller spindle in which black carbon is dispersed in rubber (such as silicon rubber and urethane rubber). The surface of the developing roller 75 is coated with fluorine-containing resin.

The friction between the developing roller 75 and the supply roller 74 and between the developing roller 75 and the blade 76 causes the developing agent T to be charged triboelectrically. In this embodiment, the developing agent T is positively charged on the developing roller 75.

The charger 78 comprises a charging wire (called corona wire) that is arranged in parallel with the photosensitive drum 77 and is about 10 mm away from the photosensitive drum 77, a shield electrode covers the charging wire but has an opening, shaped like a slit, formed in the shield electrode so as to oppose to the photosensitive drum 77, and a grid electrode is arranged in the opening and insulated from the shield electrode. Namely, the charger 78 is a scorotron-type charger.

In this embodiment, the charging wire is formed of tungsten wire having a diameter of 50 to 100 $\mu$m. The shield electrode is formed of aluminum. The grid electrode is comprised of a plurality of wires or a mesh.

The charging wire is connected to a positive pole of a power source (not shown in figures). The charging wire generates positive ions through the application of high voltage of 5 to 10 kV from the power source, whereby the positive ions move to the photosensitive drum 77. Accordingly, the photosensitive drum 77 is positively charged with charge potential due to the positive ions. The charge potential of the photosensitive drum 77 is restricted by application of a bias voltage on the grid electrode. Also, the charge potential of the photosensitive drum 77 is controlled in response to the voltage.

Herein, the charger 78 may be formed as corotron-type charger without the grid electrode, although the charger 78 is formed as scrotron-type charger in the present embodiment. Further, the charger 78 could be formed in another form to provide corona discharge, such as brush electrostatic discharge.

Ordinarily, the photosensitive drum 77 is provided as a consumable item including therein the developing agent T. When all the developing agent T runs out, the photosensitive drum 77 is removed and replaced with a new one. Therefore, the photosensitive drum 77 is preferably formed with an organic photoconductor (OPC). This OPC does not have high durability, but is lightweight and has excellent cost performance. Although, the photosensitive drum 77 could also be formed of a material having fast-sensitivity against the laser beams and long-life photoconductivity (such as an amorphous silicon, a selenium photoconductor formed of selenium or selenium alloy, or a cadmium sulfide).

The photosensitive drum 77, which has been charged by the charger 78, is scanned and exposed with the laser beams LB1, LB2 in the mainscanning and the sub-scanning directions based on the LD1 data and the LD2 data. Upon exposure with the laser beams LB1, LB2, the surface of the photosensitive drum 77 becomes photoconductive, thereby decreasing electric potential that has been charged by the charger 78. As a result, the latent image is formed on the photosensitive drum 77 according to the difference in potential. As the photosensitive drum 77 rotates in the moving direction, the photosensitive drum 77 with the latent image formed thereon contacts with the developing roller 75 that supports the developing agent T on its surface. When the photosensitive drum 77 and the developing roller 75 contact with each other, the developing agent T transfers from the developing roller 75 to the latent image. As a result, the latent image is developed with the developing agent T to form the visible image. Then, the visible image is transported toward the transfer roller 87 so as to oppose the sheet P.

The transfer roller 87 is a roller of which the surface is coated with a conductive material in which black carbon is dispersed in rubber (such as silicon rubber and urethane rubber), and is connected to a negative pole of the power source. The transfer roller 87 applies a voltage to the sheet P from the power source, so that the visible image of the developing agent T is transferred to the sheet P. After that, the transport unit 18 transports the sheet with the transferred image to the fixing unit 15.

The fixing unit 15 has a heat roller 52 and a press roller 54, and is formed as an integrated unit. The image of the developing agent T is sandwiched between the heat roller 52 and the press roller 54. The developing agent T is melted and penetrates into fibers of the sheet P, whereby the image is fixed on the sheet P.

The discharge unit 16 is provided on the downstream side of the fixing unit 15, along the sheet transporting direction, and comprises a discharge roller 55 driven by a driving circuit (not shown in figures) and subsidiary rollers 56, 57 that move in synchronism with the discharge roller 55. The discharge unit 16 discharges the sheet P from the fixing unit 15, by using the discharge roller 55 and the subsidiary rollers 56, 57, onto the sheet stack portion 8.

Although the invention has been described in detail through the specific embodiments, it would be apparent to those skilled in the art that various changes and modifications may be made therein without departing from the spirit of the invention.

For example, there may be provided more than two laser diodes. Even in this case, it is sufficient to provide a single photodiode 64 to miniaturize the laser element. Though the photodiode 64 is used in this embodiment, any type of photosensor could be used in place of the photodiode 64.

Further, the polygon mirror 23 could be replaceable by a galvanometer mirror or a hologram disk. The fθ lens, the cylindrical lens and the cylindrical-shaped photosensitive drum may be replaced with any other alternatives, respectively.

Still further, the photosensitive drum 77 is not necessarily formed in a cylindrical shape. The photosensitive medium formed in another shape, such as flatbed shape, or endless belt, could be used instead of the photosensitive drum 77.

Needless to say, the multibeam scanner of the invention is not limited for use in the laser printer. The multibeam scanner of the invention will be widely used for, for instance, an image projector.

What is claimed is:

1. A multibeam scanner for scanning an image forming area with a plurality of laser beams and forming a plurality of scanning lines corresponding to the plurality of laser beams in the image forming area, the multibeam scanner comprising:
    a plurality of beam emitting points that emit a plurality of laser beams, respectively;
    a scan position changing unit that changes scan positions at which the laser beams scan in the image forming area and in a non-image forming area;
    a timing controller that controls, in synchronism with the scan position changing unit, each of the plurality of beam emitting points to emit the laser beams during a respective beam emitting period one by one in the non-image forming area, the timing controller controlling the beam emitting point that last emits the laser beam among the plurality of the beam emitting points to emit the laser beam at a predetermined beam detecting position in the non-image forming area during its beam emitting period;
    a photoreceptor that detects each of the laser beams emitted one by one under the control of the timing controller, and outputs a beam amount signal indicating a beam amount of the laser beam;
    a beam amount controller that controls, based on the corresponding beam amount signals, the beam amounts of the laser beams emitted by the beam emitting points, respectively;
    a scan start timing detector that detects the last emitted laser beam at the predetermined beam detecting position in the non-image forming area, and determines a scan start timing upon the detection of the laser beam at the beam detecting position; and
    a scan controller that controls the beam emitting points, based on the scan start timing, to emit the laser beams, each of which beam amounts being controlled by the beam amount controller, thereby forming the plurality of scanning lines in the image forming area, wherein a time duration provided to the beam emitting point that last emits the laser beam under control of the timing controller in the non-image forming area is used not only for controlling the beam amount of the laser beam emitted from the beam emitting point that last emits the laser beam by the beam amount controller, but also for identifying the scan start timing, by use of the scan start timing detector during the time duration, for all laser beams, wherein the scan position changing unit comprises a deflector, that deflects the laser beams emitted by the beam emitting points, the deflector has a polygon mirror including a plurality of reflective surfaces and a plurality of edge portions provided between the reflective surfaces, and the timing controller inhibits the beam emitting points to emit the laser beams reaching any of the edge portions.

2. The multibeam scanner as claimed in claim 1, wherein the beam amount controller comprises:
    a beam amount signal detection unit that receives the beam amount signals;
    a beam amount determination unit that determines the beam amounts of the laser beams emitted by the beam emitting points in the image forming area, respectively, based on the beam amount signals received by the beam amount signal detection unit; and
    a control signal generation unit that outputs control signals indicating the beam amount determined by the beam amount determination unit, wherein the scan controller controls the beam emitting points to emit the laser beams based on the control signals.

3. The multibeam scanner as claimed in claim 2, wherein the beam amount determination unit has a comparison unit that compares the received beam amount signals with a predetermined reference level, and determines, upon the comparison between the received beam amount signals and the reference level, the beam amounts of the laser beams emitted by the beam emitting points in the image forming area.

4. The multibeam scanner as claimed in claim 1, further comprising:
    a plurality of beam amount controllers, each beam amount controller corresponding to one of the beam emitting points; and
    a switch that switches to one of the beam amount controllers, and inputs the beam amount signals into the corresponding beam amount controllers, respectively.

5. The multibeam scanner as claimed in claim 4, wherein each of the beam amount controllers comprises:
    a beam amount signal detection unit that receives the beam amount signal input by the switch;
    a beam amount determination unit that determines the beam amount of the laser beam emitted by the corresponding beam emitting point in the image forming area, respectively, based on the beam amount signal received by the beam amount signal detection unit; and
    a control signal generation unit that outputs a control signal indicating the beam amount determined by the beam amount determination unit, wherein the scan controller controls the beam emitting points to emit the laser beams based on the control signals, respectively.

6. The multibeam scanner as claimed in claim 1, wherein the scan position changing unit changes the scan positions in a predetermined scan direction; and the timing controller inhibits the beam emitting points to emit the laser beams in a beam inhibition area located between the scan start timing detector and the image forming area along the scan direction.

7. The multibeam scanner as claimed in claim 6, further comprising a photosensitive medium disposed over the image forming area and the beam inhibition area.

8. The multibeam scanner as claimed in claim 1, wherein the timing controller secures the beam emitting periods to the plurality of the beam emitting points respectively, the beam emitting periods being substantially equal in time length to each other.

9. The multibeam scanner as claimed in claim 1, comprising a laser diode that includes therein the plurality of beam emitting points.

10. The multibeam scanner as claimed in claim 1, comprising a plurality of laser diodes, each of the laser diodes including therein one of the plurality of beam emitting points.

11. The multibeam scanner as claimed in claim 1, wherein the scan controller sequentially controls the plurality of the beam emitting points to start emitting the laser beams, the scan controller first controlling the beam emitting point that has emitted the laser beam at the predetermined beam detecting position in the non-image forming area under the control of the timing controller to start emitting the laser beam to form the scanning line in the image forming area.

12. A method for scanning an image forming area with a plurality of laser beams and forming a plurality of scanning lines corresponding to the plurality of laser beams in the image forming area, the method comprising the steps of:

emitting a plurality of laser beams;

controlling to emit the laser beams within corresponding time durations one by one, respectively, in a non-image forming area, and to emit the laser beam last emitted at a predetermined beam detecting position;

deflecting each laser beam using a polygon mirror including a plurality of reflective surfaces and a plurality of edge portions provided between the reflective surfaces;

detecting each of the laser beams emitted one by one, and outputting a beam amount signal for each laser beam, the beam amount signal indicative of a beam amount of the corresponding laser beam;

controlling, based on the corresponding beam amount signals, the beam amounts of the laser beams, respectively;

detecting the laser beam last emitted at the beam detecting position;

determining a scan start timing upon the detection of the laser beam last emitted at the beam detecting position;

controlling, based on the scan start timing, to emit the laser beam of which beam amounts are controlled based on the beam amount signals, thereby forming the plurality of scanning lines in the image forming area, wherein a time duration provided to the last emitted laser beam is used for performing both control of the beam amount of the last emitted laser beam and identifying scan start timing for all laser beams, and wherein the step of controlling the emission of each laser beam further comprises inhibiting the laser beams from reaching any of the edge portions.

13. The method as claimed in claim 12, wherein the step of controlling the laser beam amounts comprises the steps of:

receiving the beam amount signals produced in the detecting step;

determining the beam amounts of the laser beams emitted by the beam emitting points in the image forming area, respectively, based on the beam amount signals; and outputting control signals indicating the beam amount, wherein the controlling emission step controls beam emitting points to emit the laser beams based on the control signals.

14. The method as claimed in claim 12, further comprising the steps of:

controlling each beam amount of the emitted laser beams; and switching the controlling of each beam amount on a basis of the beam amount signal for each laser beam.

15. A multibeam scanner for scanning an image forming area with a plurality of laser beams and forming a plurality of scanning lines corresponding to the plurality of laser beams in the image forming area, the multibeam scanner comprising:

beam emitting means having a plurality of emitters for emitting a corresponding plurality of laser beams;

timing control means for controlling the beam emitting means to emit the laser beams one by one within corresponding time durations, respectively, in a non-image forming area and to emit the laser beam last emitted at a predetermined beam detecting position;

beam amount detection means for detecting each of the laser beams emitted one by one under the control of the timing control means, and outputting a beam amount signal for each laser beam, the beam amount signal indicative of a beam amount of the corresponding laser beam;

beam amount control means for controlling, based on the corresponding beam amount signals, the beam amounts of the laser beams, respectively;

scan start timing detection means for detecting the laser beam last emitted at the beam detecting position;

scan start timing determination means for determining a scan start timing upon the detection of the laser beam last emitted at the beam detecting position; and scan control means for controlling the beam emitting means, based on the scan start timing, to emit the plurality of laser beams of which beam amounts are controlled based on the beam amount signals, thereby forming the plurality of scanning lines in the image forming area, wherein a time duration provided to an emitter that last emits a laser beam under control of the timing control means is used not only for controlling the beam amount of the laser beam emitted from the emitter that last emits a laser beam by the beam amount control means, but also for identifying the scan start timing for all laser beams by use of the scan start timing detection means during the time duration, wherein the timing control means comprises a deflector that deflects the laser beams emitted by the beam emitting means, the deflector has a polygon mirror including a plurality of reflective surfaces and a plurality of edge portions provided between the reflective surfaces, and the timing control means inhibits the beam emitting means to emit the laser beams reaching any of the edge portions.

16. The multibeam scanner as claimed in claim 15, wherein the beam amount control means comprises:

beam amount signal detection means for receiving the beam amount signals;

beam amount determination means for determining the beam amounts of the laser beams emitted by the beam emitting means in the image forming area, respectively, based on the beam amount signals received by the beam amount signal detection means; and control signal generation means for outputting control signals indicating the beam amount determined by the beam amount determination means, wherein the scan means controls the beam emitting means to emit the laser beams based on the control signals.

17. The multibeam scanner as claimed in claim 15, further comprising:

a plurality of beam amount controller means, each beam amount controller means corresponding to one of the beam emitting means; and switch means for switching to one of the beam amount controller means, and inputs the beam amount signals into the corresponding beam amount controller means, respectively.

* * * * *